US007976144B2

(12) United States Patent
Esplin et al.

(10) Patent No.: US 7,976,144 B2
(45) Date of Patent: Jul. 12, 2011

(54) SYSTEM AND METHOD FOR DELIVERING SOLID INK STICKS TO A MELTING DEVICE THROUGH A NON-LINEAR GUIDE

(75) Inventors: Ernest Isreal Esplin, Sheridan, OR (US); Michael Alan Fairchild, Vancouver, WA (US); Chad David Freitag, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 639 days.

(21) Appl. No.: 11/602,931

(22) Filed: Nov. 21, 2006

(65) Prior Publication Data

US 2008/0117272 A1 May 22, 2008

(51) Int. Cl.
*B41J 2/175* (2006.01)
*G01D 11/00* (2006.01)

(52) U.S. Cl. .......................................... 347/88; 347/99

(58) Field of Classification Search ................ 347/7, 88; 221/172; 211/59.2; 222/146.5
See application file for complete search history.

(56) References Cited

U.S. PATENT DOCUMENTS

| | | | | |
|---|---|---|---|---|
| 2,901,118 | A * | 8/1959 | Beesley | 211/59.2 |
| 3,656,360 | A | 4/1972 | Fix | |
| 3,773,069 | A | 11/1973 | Rebentisch | |
| 4,199,082 | A * | 4/1980 | Ornsteen | 222/146.5 |
| 4,593,292 | A | 6/1986 | Lewis | |
| 4,636,803 | A | 1/1987 | Mikalsen | |
| 4,682,187 | A | 7/1987 | Martner | |
| 5,123,961 | A | 6/1992 | Yamamoto | |
| 5,181,049 | A * | 1/1993 | Mackay et al. | 347/88 |
| 5,223,860 | A | 6/1993 | Loofbourow et al. | |
| 5,276,468 | A | 1/1994 | Deur et al. | |
| 5,341,164 | A | 8/1994 | Miyazawa et al. | |
| 5,379,915 | A * | 1/1995 | Hudspeth et al. | 221/172 |
| 5,386,224 | A * | 1/1995 | Deur et al. | 347/7 |

(Continued)

FOREIGN PATENT DOCUMENTS

EP 0683051 A2 11/1995

(Continued)

OTHER PUBLICATIONS

Non-Final Office Action for U.S. Appl. No. 11/602,710 Mailed Aug. 11, 2009, United States Patent and Trademark Office (7 pages).

(Continued)

*Primary Examiner* — Stephen D Meier
*Assistant Examiner* — Carlos A Martinez, Jr.
(74) *Attorney, Agent, or Firm* — Maginot, Moore & Beck LLP

(57) ABSTRACT

A solid ink delivery system provides solid ink sticks to a melting device in a printer. The delivery system includes a guide for guiding the stick in a prescribed path. The guide defines an inlet for receiving the stick. The inlet provides unobstructed passage of the stick through the inlet. The guide also defines a channel having a first end and a second end. The first end extends from the inlet. The channel provides unobstructed passage of the stick through the channel. The channel is adapted to contain a plurality of sticks in the channel. The guide further defines an outlet extending from the second end of the channel. The outlet provides unobstructed passage of the stick through the channel. The outlet is positioned below the inlet whereby only gravity is used to advance the sticks from the inlet to the outlet.

8 Claims, 16 Drawing Sheets

U.S. PATENT DOCUMENTS

| | | | | |
|---|---|---|---|---|
| 5,442,387 | A | 8/1995 | Loofbourow et al. | |
| 5,510,821 | A | 4/1996 | Jones et al. | |
| D371,157 | S | 6/1996 | Chambers | |
| D371,801 | S | 7/1996 | Jones et al. | |
| D371,802 | S | 7/1996 | Jones et al. | |
| D372,268 | S | 7/1996 | Jones et al. | |
| D372,270 | S | 7/1996 | Jones et al. | |
| D373,139 | S | 8/1996 | Jones et al. | |
| D379,470 | S | 5/1997 | Gilbert | |
| D379,471 | S | 5/1997 | Gilbert | |
| D379,639 | S | 6/1997 | Gilbert | |
| D379,640 | S | 6/1997 | Gilbert | |
| D380,771 | S | 7/1997 | Jones | |
| D383,153 | S | 9/1997 | Jones et al. | |
| D383,154 | S | 9/1997 | Jones et al. | |
| 5,689,288 | A | 11/1997 | Wimmer et al. | |
| 5,734,402 | A | 3/1998 | Rousseau et al. | |
| 5,784,089 | A | 7/1998 | Crawford | |
| D402,308 | S | 12/1998 | Yao et al. | |
| D403,351 | S | 12/1998 | Yao et al. | |
| D403,352 | S | 12/1998 | Brown et al. | |
| D403,699 | S | 1/1999 | Chin et al. | |
| 5,861,903 | A | 1/1999 | Crawford et al. | |
| D407,109 | S | 3/1999 | Yao et al. | |
| D407,110 | S | 3/1999 | Yao et al. | |
| D407,111 | S | 3/1999 | Brown et al. | |
| D407,742 | S | 4/1999 | Yao et al. | |
| D407,743 | S | 4/1999 | Yao et al. | |
| D407,745 | S | 4/1999 | Brown et al. | |
| D408,849 | S | 4/1999 | Chin et al. | |
| D409,235 | S | 5/1999 | Chin et al. | |
| D409,237 | S | 5/1999 | Ellers et al. | |
| D410,026 | S | 5/1999 | Brown et al. | |
| D410,490 | S | 6/1999 | Mattern et al. | |
| 5,917,528 | A | 6/1999 | Grellmann et al. | |
| D412,527 | S | 8/1999 | Ellers et al. | |
| D412,528 | S | 8/1999 | Ellers et al. | |
| D412,934 | S | 8/1999 | Jones | |
| D413,625 | S | 9/1999 | Brown et al. | |
| D414,200 | S | 9/1999 | Jones | |
| D415,193 | S | 10/1999 | Jones | |
| D416,936 | S | 11/1999 | Chin et al. | |
| 5,975,690 | A | 11/1999 | Grellmann et al. | |
| 5,988,805 | A | 11/1999 | Meinhardt | |
| 6,053,608 | A | 4/2000 | Ishii et al. | |
| 6,056,394 | A | 5/2000 | Rousseau et al. | |
| 6,089,686 | A | 7/2000 | Thornton et al. | |
| 6,109,803 | A | 8/2000 | Yasui et al. | |
| D436,124 | S | 1/2001 | Mattern et al. | |
| D436,989 | S | 1/2001 | Mattern et al. | |
| 6,170,942 | B1 | 1/2001 | Ogawa et al. | |
| D440,248 | S | 4/2001 | Mattern et al. | |
| D440,249 | S | 4/2001 | Ellers et al. | |
| 6,334,658 | B1 | 1/2002 | Suzuki | |
| D453,786 | S | 2/2002 | Mattern | |
| D453,787 | S | 2/2002 | Mattern | |
| 6,422,694 | B1 * | 7/2002 | Hollands | 347/88 |
| 6,543,867 | B1 | 4/2003 | Jones | |
| 6,561,636 | B1 | 5/2003 | Jones | |
| 6,565,200 | B1 | 5/2003 | Jones | |
| 6,565,201 | B1 | 5/2003 | Jones | |
| 6,572,225 | B1 | 6/2003 | Jones | |
| D478,347 | S | 8/2003 | Jones | |
| D478,621 | S | 8/2003 | Jones | |
| D479,368 | S | 9/2003 | Jones | |
| D481,757 | S | 11/2003 | Jones | |
| D481,758 | S | 11/2003 | Jones | |
| D481,759 | S | 11/2003 | Jones et al. | |
| D482,062 | S | 11/2003 | Jones | |
| D482,063 | S | 11/2003 | Jones et al. | |
| D482,388 | S | 11/2003 | Jones | |
| D482,389 | S | 11/2003 | Jones | |
| D482,720 | S | 11/2003 | Jones et al. | |
| D482,721 | S | 11/2003 | Jones | |
| D482,722 | S | 11/2003 | Jones | |
| 6,648,435 | B1 | 11/2003 | Jones | |
| D483,062 | S | 12/2003 | Jones | |
| D483,063 | S | 12/2003 | Jones | |
| D483,404 | S | 12/2003 | Jones et al. | |
| 6,672,716 | B2 | 1/2004 | Jones | |
| 6,679,591 | B2 | 1/2004 | Jones | |
| 6,705,710 | B2 | 3/2004 | Jones et al. | |
| 6,709,094 | B2 | 3/2004 | Jones | |
| 6,719,413 | B2 | 4/2004 | Jones | |
| 6,719,419 | B2 | 4/2004 | Jones et al. | |
| 6,722,764 | B2 | 4/2004 | Jones et al. | |
| 6,739,713 | B2 | 5/2004 | Jones et al. | |
| 6,746,113 | B1 | 6/2004 | Leighton et al. | |
| 6,755,517 | B2 | 6/2004 | Jones et al. | |
| 6,761,443 | B2 | 7/2004 | Jones | |
| 6,761,444 | B2 | 7/2004 | Jones et al. | |
| 6,772,764 | B2 | 8/2004 | Chapman | |
| 6,824,241 | B2 | 11/2004 | Sonnichsen et al. | |
| D500,784 | S | 1/2005 | Jones et al. | |
| D500,785 | S | 1/2005 | Jones et al. | |
| 6,840,612 | B2 | 1/2005 | Jones et al. | |
| 6,840,613 | B2 | 1/2005 | Jones | |
| 6,857,732 | B2 | 2/2005 | Jones et al. | |
| 6,866,375 | B2 | 3/2005 | Leighton et al. | |
| 6,874,880 | B2 | 4/2005 | Jones | |
| 6,893,121 | B2 | 5/2005 | Jones | |
| 6,895,191 | B2 | 5/2005 | Rommelmann et al. | |
| D505,974 | S | 6/2005 | Jones et al. | |
| 6,905,201 | B2 | 6/2005 | Leighton | |
| 6,929,360 | B2 | 8/2005 | Jones | |
| 6,966,644 | B2 | 11/2005 | Jones et al. | |
| 6,981,754 | B2 | 1/2006 | Godil et al. | |
| 6,986,570 | B2 | 1/2006 | Jones et al. | |
| 7,063,412 | B2 | 6/2006 | Jones et al. | |
| 7,066,589 | B2 | 6/2006 | Jones et al. | |
| D524,370 | S | 7/2006 | Jones et al. | |
| 7,104,635 | B2 | 9/2006 | Jones | |
| D531,210 | S | 10/2006 | Jones | |
| D533,900 | S | 12/2006 | Jones et al. | |
| D535,327 | S | 1/2007 | Korn et al. | |
| D535,689 | S | 1/2007 | Jones et al. | |
| D537,116 | S | 2/2007 | Jones et al. | |
| 7,780,284 | B2 | 8/2010 | Fairchild et al. | |
| 7,798,624 | B2 | 9/2010 | Fairchild et al. | |
| 2003/0202066 | A1 | 10/2003 | Jones | |
| 2003/0202067 | A1 | 10/2003 | Jones et al. | |
| 2003/0202069 | A1 | 10/2003 | Jones | |
| 2003/0202070 | A1 | 10/2003 | Jones | |
| 2003/0202071 | A1 | 10/2003 | Jones et al. | |
| 2003/0202074 | A1 | 10/2003 | Jones | |
| 2003/0202075 | A1 | 10/2003 | Jones | |
| 2003/0202077 | A1 | 10/2003 | Jones et al. | |
| 2003/0222930 | A1 | 12/2003 | Jones | |
| 2003/0222951 | A1 | 12/2003 | Jones | |
| 2003/0222952 | A1 | 12/2003 | Jones | |
| 2003/0222953 | A1 | 12/2003 | Jones | |
| 2003/0222954 | A1 | 12/2003 | Jones et al. | |
| 2003/0222955 | A1 | 12/2003 | Jones | |
| 2004/0160498 | A1 | 8/2004 | Jones | |
| 2004/0179074 | A1 | 9/2004 | Jones et al. | |
| 2004/0183875 | A1 | 9/2004 | Jones et al. | |
| 2005/0007428 | A1 * | 1/2005 | Joppen | 347/88 |
| 2005/0063820 | A1 | 3/2005 | Awdalla | |
| 2005/0146584 | A1 * | 7/2005 | Godil et al. | 347/88 |
| 2005/0151814 | A1 | 7/2005 | Wong et al. | |
| 2006/0227193 | A1 | 10/2006 | Leighton | |
| 2007/0153068 | A1 * | 7/2007 | Jones et al. | 347/88 |
| 2008/0088688 | A1 | 4/2008 | Jones et al. | |
| 2008/0122907 | A1 * | 5/2008 | Jones | 347/88 |

FOREIGN PATENT DOCUMENTS

| | | | |
|---|---|---|---|
| EP | 1122075 | A1 | 8/2001 |
| EP | 1359019 | A1 | 5/2003 |
| JP | 11115213 | * | 4/1999 |

OTHER PUBLICATIONS

Amendment in Response to Non-Final Office Action for U.S. Appl. No. 11/602,710 Submitted Nov. 12, 2009 (13 pages).

Final Office Action for U.S. Appl. No. 11/602,710 Mailed Mar. 5, 2010 United States Patent and Trademark Office (7 pages).

Amendment accompanying a Request for Continued Examination for U.S. Appl. No. 11/602,710 Submitted Apr. 23, 2010 (5 pages).
Non-Final Office Action for U.S. Appl. No. 11/602,937 Mailed Sep. 21, 2009, United States Patent and Trademark Office (7 pages).
Amendment in Response to Non-Final Office Action for U.S. Appl. No. 11/602,937, submitted Dec. 21, 2009 (8 pages).
Final Office Action for U.S. Appl. No. 11/602,937 Mailed Apr. 14, 2010, United States Patent and Trademark Office (8 pages).
Amendment accompanying a Request for Continued Examination for U.S. Appl. No. 11/602,937, submitted Apr. 23, 2010 (10 pages).
Non-Final Office Action for U.S. Appl. No. 11/602,938 Mailed Aug. 7, 2009, United States Patent and Trademark Office (10 pages).
Amendment in Response to Non-Final Office Action for U.S. Appl. No. 11/602,938, submitted Sep. 2, 2009 (29 pages).
Non-Final Office Action for U.S. Appl. No. 11/602,943 Mailed Jun. 25, 2009, United States Patent and Trademark Office (7 pages).
Amendment in Response to Non-Final Office Action for U.S. Appl. No. 11/602,943, submitted Sep. 24, 2009 (13 pages).
Final Office Action for U.S. Appl. No. 11/602,943 Mailed Jan. 21, 2010, United States Patent and Trademark Office (9 pages).
Amendment accompanying a Request for Continued Examination for U.S. Appl. No. 11/602,943, submitted Mar. 22, 2010 (10 pages).
Second Non-Final Office Action for U.S. Appl. No. 11/602,943 Mailed Apr. 14, 2010, United States Patent and Trademark Office (5 pages).
Amendment in Response to second Non-Final Office Action for U.S. Appl. No. 11/602,943, submitted Apr. 23, 2010 (10 pages).
International Search Report in corresponding European Application No. 07120873.0 mailed May 19, 2008 (9 pages).
International Search Report in corresponding European Application No. 07120873.0 mailed Mar. 4, 2008 (5 pages).
International Search Report in corresponding European Application No. 07120975.3 mailed Mar. 14, 2008 (5 pages).
Amendment in Response to Second Non-Final Office Action for U.S. Appl. No. 11/602,710 Submitted Jul. 13, 2010 (6 pages).
Second Non-Final Office Action for U.S. Appl. No. 11/602,710 Mailed May 13, 2010, United States Patent and Trademark Office (8 pages).
Final Office Action for U.S. Appl. No. 12/016,675, Mailed Sep. 28, 2010, United States Patent and Trademark Office (10 pages).
Amendment in Response to Final Office Action for U.S. Appl. No. 12/016,675, submitted Oct. 15, 2010 (10 pages).
Non-Final Office Action for U.S. Appl. No. 11/975,856, Mailed Nov. 17, 2010, United States Patent and Trademark Office (8 pages).
Amendment in Response to Non-Final Office Action for U.S. Appl. No. 11/975,856, submitted Jan. 18, 2011 (9 pages).
Final Office Action for U.S. Appl. No. 11/602,710, Mailed Sep. 30, 2010, United States Patent and Trademark Office (7 pages).
Amendment in Response to Final Office Action for U.S. Appl. No. 11/602,710, submitted Oct. 27, 2010 (6 pages).

* cited by examiner

SYSTEM AND METHOD FOR DELIVERING SOLID INK STICKS TO A MELTING DEVICE THROUGH A NON-LINEAR GUIDE

1. CROSS-REFERENCE TO RELATED APPLICATIONS

Cross reference is made to the following applications: 1776-0091 titled, "Transport System for Solid Ink in a Printer",having Ser. No. 11/602,943; 1776-0093 titled "Guide For Printer Solid Ink Transport and Method", having Ser. No. 11/602,937; 1776-0102 titled "Solid Ink Stick Features for Printer Ink Transport and Method", having Ser. No. 11/602,710; and 1776-0133 titled "Transport System for Solid Ink for Cooperation with Melt Head in a Printer" having Ser. No. 11/602,938; all of which were filed concurrently herewith and are expressly incorporated herein by reference.

2. TECHNICAL FIELD

The printer described herein generally relates to high speed printers which have one or more print heads that receive molten ink heated from solid ink sticks or pellets. More specifically, the printer relates to improving the ink transport system design and functionality.

3. BACKGROUND OF RELATED ART

So called "solid ink" printers encompass various imaging devices, including printers and multi-function platforms and offer many advantages over many other types of high speed or high output document reproduction technologies such as laser and aqueous inkjet approaches. These often include higher document throughput (i.e., the number of documents reproduced over a unit of time), fewer mechanical components needed in the actual image transfer process, fewer consumables to replace, sharper images, as well as being more environmentally friendly (far less packaging waste).

A schematic diagram for a typical solid ink imaging device is illustrated in FIG. 1. The solid ink imaging device, hereafter simply referred to as a printer 100 has an ink loader 110 which receives and stages solid ink sticks which remain in solid form at room temperatures. The ink stock can be refilled by a user by simply adding more ink as needed to the ink loader 110. Separate loader channels are used for the different colors. For, example, only black solid ink is needed for monochrome printing, while solid ink colors of black, cyan, yellow and magenta are typically needed for color printing. Each color is loaded and fed in independent channels of the ink loader.

An ink melt unit 120 melts the ink by raising the temperature of the ink sufficiently above its melting point. During a melting phase of operation, the leading end of an ink stick contacts a melt plate or heated surface of the melt unit and the ink is melted in that region. The liquefied ink is supplied to a single or group of print heads 130 by gravity, pump action, or both. In accordance with the image to be reproduced, and under the control of a printer controller (not shown), a rotating print drum 140 receives ink droplets representing the image pixels to be transferred to paper or other media 170 from a sheet feeder 160. To facilitate the image transfer process, a pressure roller 150 presses the media 170 against the print drum 140, whereby the ink is transferred from the print drum to the media. The temperature of the ink can be carefully regulated so that the ink fully solidifies just after the image transfer.

While there may be advantages to the use of solid ink printers compared to other image reproduction technologies, high speed and voluminous printing sometimes creates issues not satisfactorily addressed by the prior art solid ink printing architectures. To meet the large ink volume requirement, ink must have large storage capacity and be able to be replenished by loading ink at any time the loader has capacity for additional ink.

In typical prior art solid ink loaders, the ink sticks are positioned end to end in a channel or chute with a melt device on one end and a spring biased push block on the other end. This configuration requires the operator to manually advance the ink in the chute to provide space to insert additional ink sticks, to the extent there is capacity in the channel. This configuration may be somewhat cumbersome for loading large quantities of ink sticks in newer, larger capacity and faster printing products, as the operator has to repeatedly insert an ink stick and then push it forward manually when loading multiple ink sticks in the same channel.

Another issue is that the spring biased push block mechanism limits the amount of ink that can be stored in each channel. Extended capacity loaders with greater length require longer, higher force springs so the push block mechanism can become prohibitably bulky and expensive. Closing an access cover in opposition to the greater spring force needed for larger amounts of ink can be inconvenient or unacceptable to the user during the ink loading process.

Further, constant force springs limits the quantity of ink sticks that may be placed in the chute as the spring biased push block takes space in the chute that otherwise would hold additional ink.

Also, the spring biased push block pushes the ink from the back of the ink sticks, which may lead to undesirable steering or reorienting of the ink. Pushing larger sticks, particularly a longer stack of ink sticks from the back of a stick can lead to buckling and jamming of the. Jamming is more pronounced when there is high feed friction. To minimize friction, a lubricious tape or similar non-stick surface is often used, adding additional cost to the product.

Also, the spring biased push stick mechanism limits printer configuration because a spring biased push stick is better suited for two axis ink stick keying, than it is for one axis keying, One axis keying prefers stick loading from the end of the chute and this loading is more difficult when spring biased push stick mechanisms are used.

4. SUMMARY

In view of the above-identified problems and limitations of the prior art and alternate ink and ink loader forms, a solid ink supply system is disclosed herein that is adapted for use with printers.

In one embodiment, a solid ink delivery system for use with a solid ink stick for use in printers is provided. The solid ink delivery system delivers the stick to a melting station for melting the stick so that the ink may be transferred to media to form an image on the media. The delivery system includes a guide for guiding the stick in a prescribed path. The guide defines an inlet for receiving the stick. The inlet provides unobstructed passage of the stick through the inlet. The guide also defines a channel having a first end and a second end. The first end extends from the inlet. The channel provides unobstructed passage of the stick through the channel. The channel is adapted to contain a plurality of sticks in the channel. The guide further defines an a outlet extending from the second end of the channel. The outlet provides unobstructed passage of the stick through the channel. The outlet is positioned below the inlet whereby only gravity is used to advance the sticks from the inlet to the outlet.

In another embodiment, a printer including a solid ink delivery system for use with a solid ink stick is provided. A printer includes an ink delivery system for delivering ink for transfer to media to form an image on the media. The ink delivery system includes a guide for guiding the stick in a prescribed path. The guide defines an inlet for receiving sticks. The inlet provides unobstructed passage of the sticks through the inlet. The guide also defines a channel having a first end and a second end. The first end extends from the inlet. The channel provides unobstructed passage of the stick through the channel. The channel is adapted to contain a plurality of sticks in the channel. The guide also defines a outlet extending from the second end of the channel. The outlet provides unobstructed passage of the stick through the outlet. The outlet is positioned below the inlet whereby only gravity is used to advance the sticks from the inlet to the outlet. The ink delivery system also includes a melt unit for melting the stick. The melt unit is positioned adjacent the outlet of the guide.

In yet another embodiment, a method of advancing solid ink in a printer toward a melt station is provided. The method includes the step of providing at least one solid ink stick defining a longitudinal axis of the stick and an external periphery of the stick. The method also includes the step of providing a guide for guiding a plurality of sticks through the guide. The method also includes the steps of inserting a first stick into the guide and inserting a second stick into the guide. The method also includes the step of permitting the first stick and the second to advance unobstructed except as to each other through the guide to the melt station with the assistance only of gravity.

The ink delivery system for printers described herein uses a driver, for example in the form of a belt, to advance the ink from the loading station to the melting station where molten ink can be transferred to one or more print heads. The many additional described features of this ink delivery system, which can be selectively incorporated individually or in any combination, enable many additional printer system opportunities, including lower cost, enlarged ink storage capacity, as well as more robust feed reliability.

5. BRIEF DESCRIPTION OF THE DRAWINGS

Features of the printer described herein will become apparent to those skilled in the art from the following description with reference to the drawings, in which.

6. DETAILED DESCRIPTION

The term “printer” refers, for example, to reproduction devices in general, such as printers, facsimile machines, copiers, and related multi-function products, and the term “print job” refers, for example, to information including the electronic item or items to be reproduced. References to ink delivery or transfer from an ink cartridge or housing to a print head are intended to encompass the range of intermediate connections, tubes, manifolds, heaters and/or other components that may be involved in a printing system but are not immediately significant to the printer described herein.

The general components of a solid ink printer have been described supra. The printer disclosed herein includes a solid ink delivery system, and a solid ink printer and a method for incorporating the same.

Figure 1:
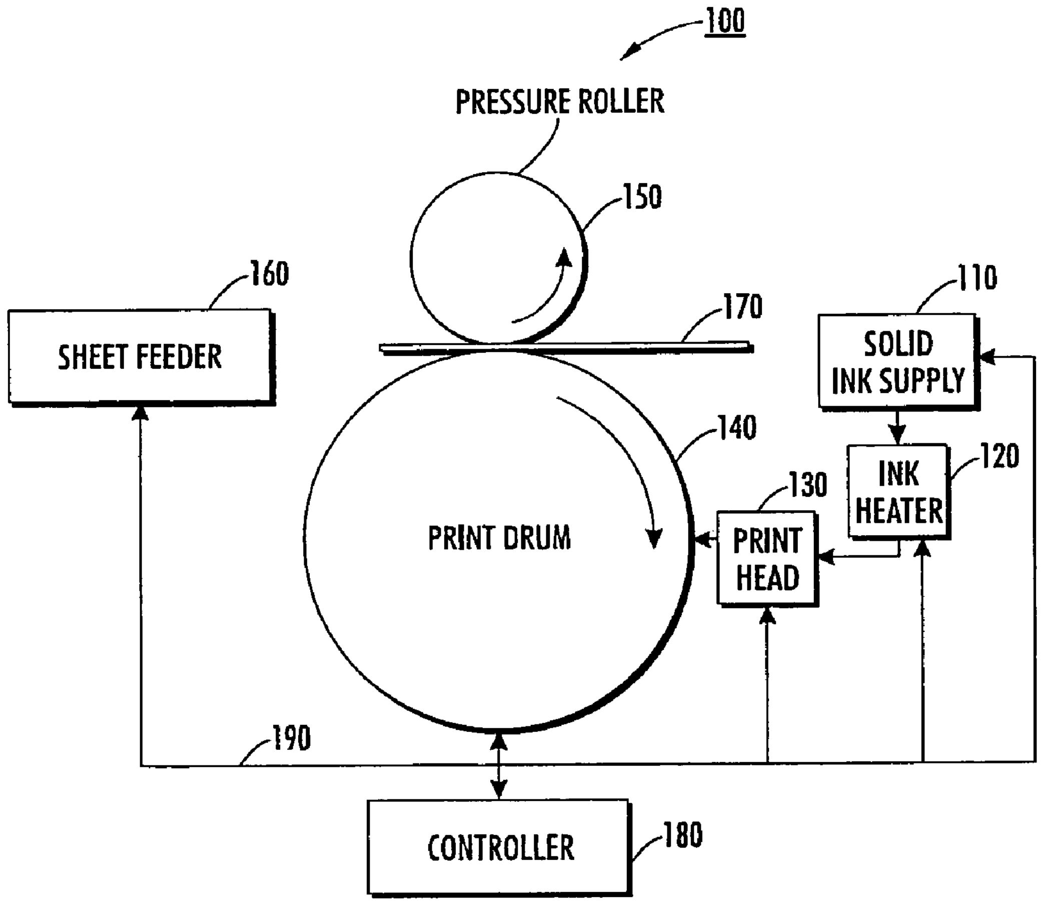
FIG. 1 PRIOR ART
FIG. 1 is a general schematic diagram of a prior art high speed, solid ink printer.
Figure 2:
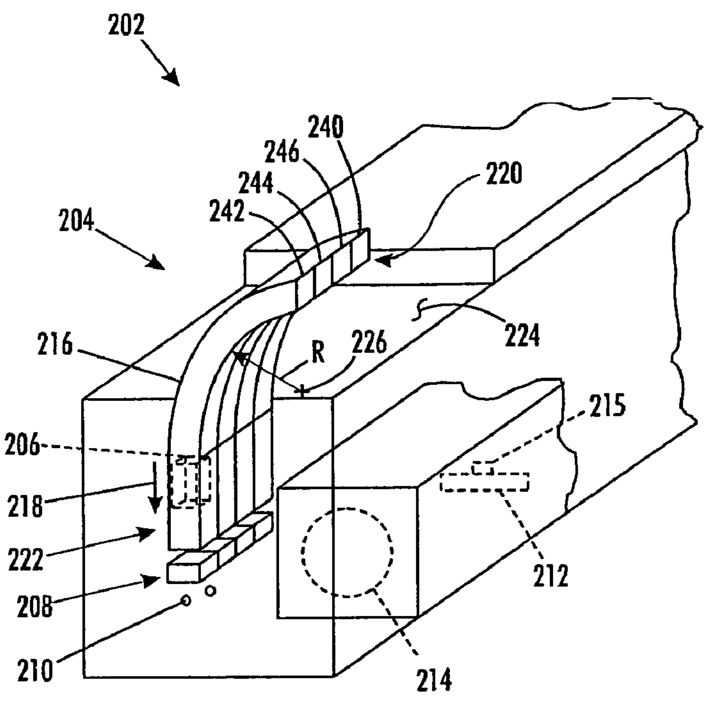
FIG. 2 is a partial perspective view of an embodiment of a solid ink delivery system for delivering solid ink stock to a melting station for converting the solid ink into liquid form for delivery to print heads of the printer.

Referring now to FIG. 2, a solid ink printer 202 is shown. The printer 202 includes a solid ink delivery system 204 for use with a solid ink stick 206. The printer 202 includes the ink delivery system 204 for delivering the stick 206 to a melting station where a melting unit 208 is used to melt the stick 206. The ink in the stick 206 changes phase from a solid to a liquid and the liquid ink 210 is transferred to media, for example, a sheet of paper 212, by a drum 214 to form an image 215 on the paper 212. The ink delivery system 204 includes a guide for guiding the stick 206 in a prescribed path 218. The guide may be, for example, in the form of a guide or chute 216. The chute 216 defines a loading position 220 to permit the stick 206 to be placed into the guide or chute 216. The chute 216 is configured to contain and guide the sticks along the feed path from insertion to melt unit 208.

The chute 216 also defines a delivery position 222 adjacent to the melting unit 208. The loading position 220 is located above the delivery position 222. The stick 206 is slideably fitted to the chute 216 whereby only gravity advances the stick 206 from the loading position 220 to the delivery position 222.

It should be appreciated that the chute 216 may have any suitable shape such that the sticks 206 fall by gravity from loading position 220, that may be positioned near, for example, the printer top work surface 224, toward the melting unit 208. The chute 216 may be linear or arcuate. The arcuate portion may be comprised of a single or multiple arc axes, including continuously variable 3 dimensional arc paths, any combination of which can be of any length relative to the full arcuate portion. The term arcuate refers to these and any similar, non linear configuration. For example the chute 216 may, as is shown in FIG. 2, be of a continuous arcuate shape defined by a radius R extending from the origin 226. It should be appreciated that origin 226 may be positioned anywhere with respect to the chute 216 and that the radius R may be constant, or, as is shown in FIG. 2, vary such that the radius R may increase such that the chute is virtually vertical near the melting unit 208.

The chute configuration examples shown in the various alternative embodiments are depicted as fully matching the ink shape at least in one sectional axis. The chute need not match the ink shape in this fashion and need not be completely encircling. One or more sides may be fully or partially open or differently shaped. The side surfaces of the chute do not need to be continuous over the chute length. The chute need only provide an appropriate level of support and/or guidance to complement reliable loading and feeding of ink sticks intended for use in any configuration.

Figure 3:
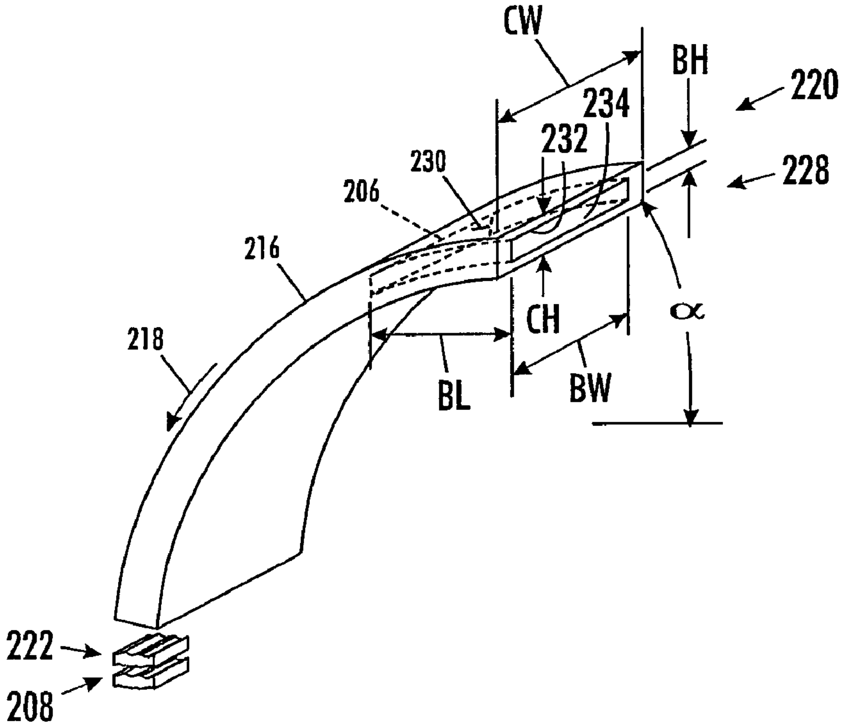
FIG. 3 is a partial perspective view of the chute of the solid ink delivery system of FIG. 2.

Referring now to FIG. 3, it should be appreciated that the chute 216 forms a stick opening 228 in a suitable size and shape and to provide for the uniform movement of the sticks 206 down the chute 216 along the path 218. To avoid cross loading or jamming of the sticks 206 in the chute 216, the sticks 206 may have an external periphery 230 which closely conforms with internal periphery 232 formed in the stick opening 228 of the chute 216.

For example, and as is shown in FIG. 3, the sticks 206 may be rectangular and the stick opening 228 of the chute 216 may be rectangular and slightly larger than the sticks 206 to provide the ability of the sticks 206 to fall by gravity down the chute 216. For example, and as shown in FIG. 3, the sticks have a stick length BL, a stick height BH, and a stick width BW. The stick opening 228 of the chute 216 may be defined by a chute height CH slightly larger than the stick height BH and a chute width CW slightly wider than the stick width BW.

Further to assure that the sticks 206 fall by gravity down the opening 228 of the chute 216 and as is shown in FIG. 3, the bottom surface 234 of the chute opening 228 may form an angle $\alpha$ with the horizontal plane such that the force of gravity may exceed the coefficient of friction between the sticks 206 and the chute lower surface 234 such that the sticks advance along the path 218 from the loading position 220 to the delivery position 222. Friction values are not definite and will vary based on numerous factors of a given system, such as stick size, stick to stick interfaces, angle of travel relative to gravity and so forth. A lubricious tape or similar non-stick surface may be applied to the bottom surface 234 to minimize friction,.

Referring again to FIG. 2, the printer 202, as shown in FIG. 2, is a color ink printer. The chute 216, as shown in FIG. 2, include a first black chute 240, a second cyan ink chute 242, a third magenta ink chute 244, and a fourth yellow ink chute 246. The four ink chutes 240, 242, 244 and 246 may each have their respective keys to provide for the entry of only the proper ink stick. The colors have been described in a specific sequence but may be sequenced in any order for a particular printer. Keyed insertion openings define which color will be admitted into a particular color chute of the chute 216. It should be appreciated that the printer disclosed herein may be a black or mono-chrome printer. A black or mono-chrome printer may have a solitary chute or may have multiple parallel chutes feeding the same color for the highest possible capacity. The ink chutes in a mono-chrome printer may likewise have gravity feed.

Figure 4:
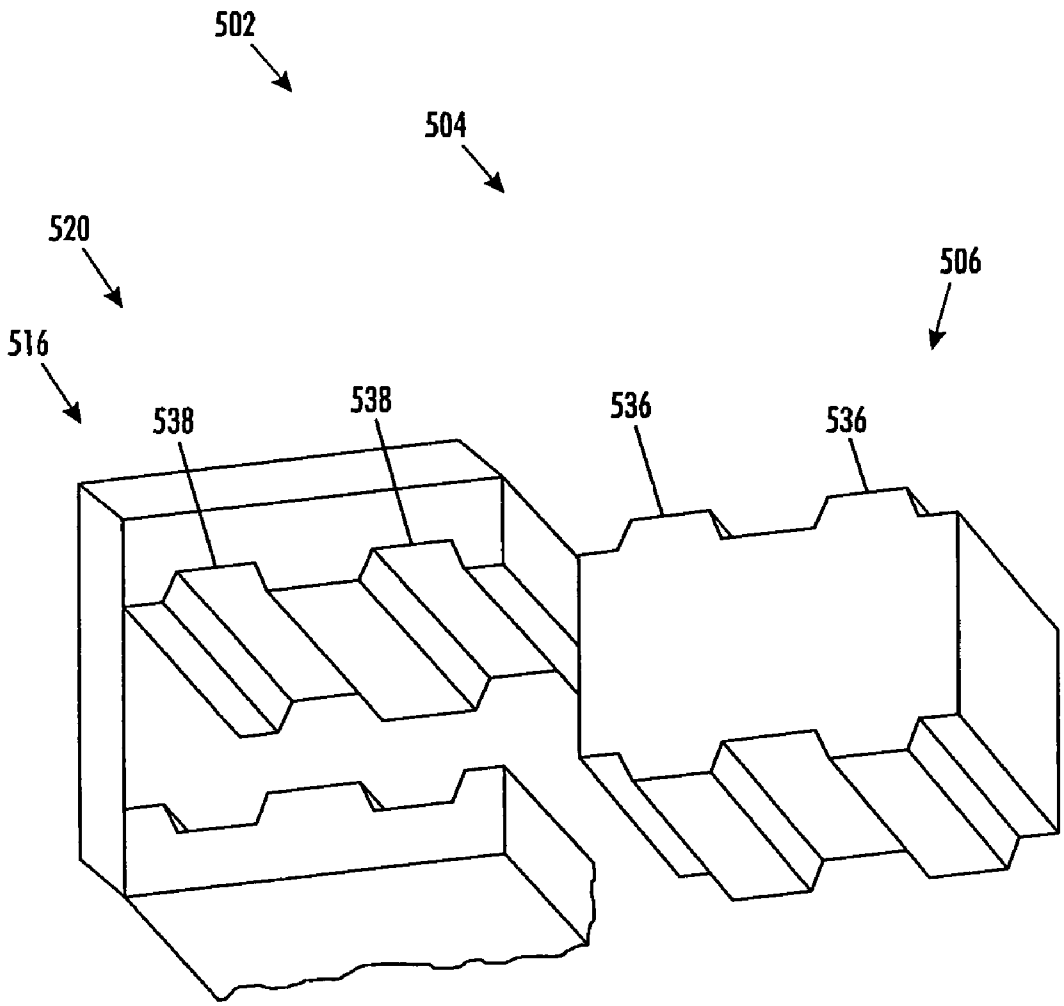
FIG. 4 is a partial perspective view of an ink stick and the loading station of the chute of FIG. 7.
Figure 5:
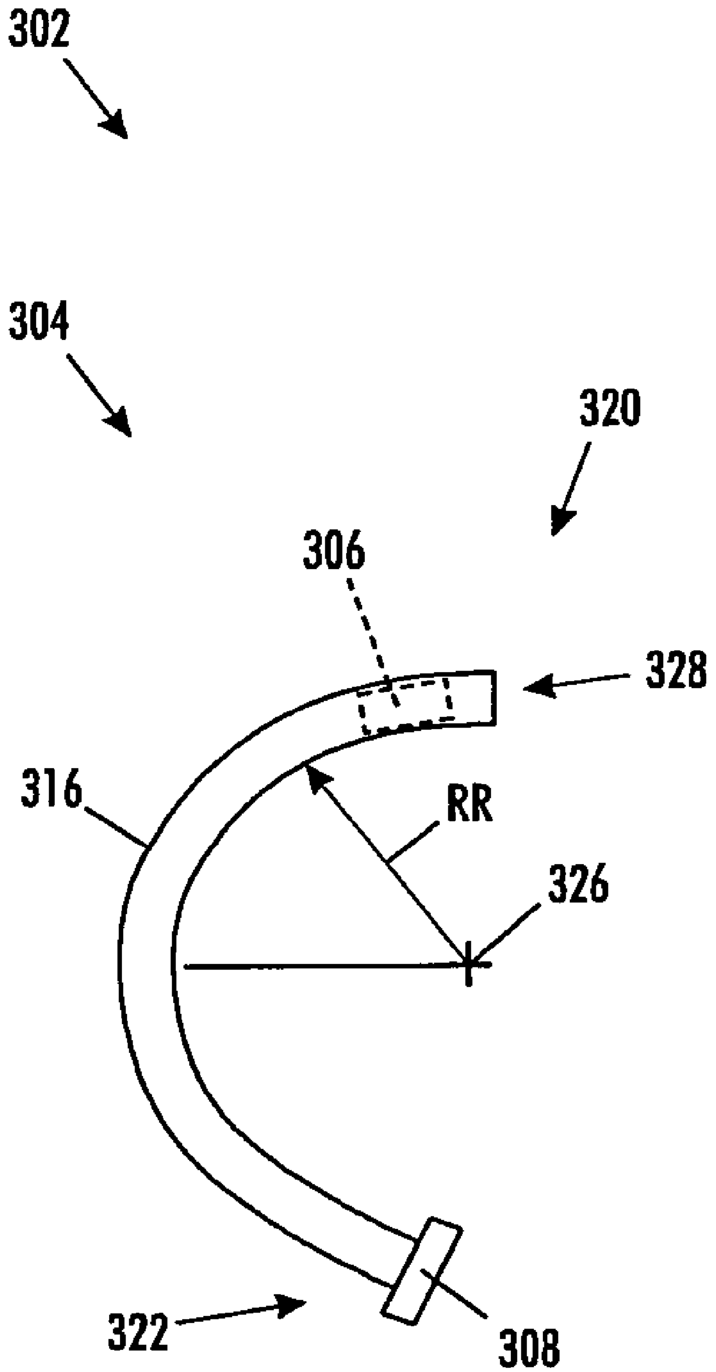
FIG. 5 is a partial plan view of another embodiment of the solid ink delivery system with a chute that has a portion that extends underneath another portion of the chute.

Referring now to FIG. 5, another embodiment of the printer is shown as ink printer 302 which includes solid ink delivery ink system 304 that is somewhat different than the ink delivery system 204 of the ink printer 202 of FIGS. 2-4. The ink delivery system 304 of FIG. 5 includes a chute 316 which is different than the chute 216 of the ink delivery system 204 of FIGS. 2-4. The chute 316 is similarly an arcuate chute and is defined by radius RR extending from origin 326. The radius RR may be constant or may vary, for example, by increasing.

The chute 316, as shown in FIG. 5, has a path that crosses over itself, or in other words the upper portions of the chute 316 may be positioned over the lower portions of chute 316. Such a chute configuration such as chute 316 may be conservative of space. It should be appreciated that the chute 316 may lie in a single plane or in a plurality of non-parallel planes. In other words, the chute 316 may form, for example, a spiral shape or a helical shape.

The chute 316 may have any size and shape and opening 328 of the chute 316 may, for example, be rectangular, triangular, pentagonal, or have any other shape. The size and shape of the opening 328 of the chute 316 is preferably similar to the size and shape of the stick 306 to be positioned in the chute 316 so that the stick 306 may freely fall by gravity down the chute 316 from the loading position 320 to delivery position 322 adjacent melting units 308.

Figure 6:
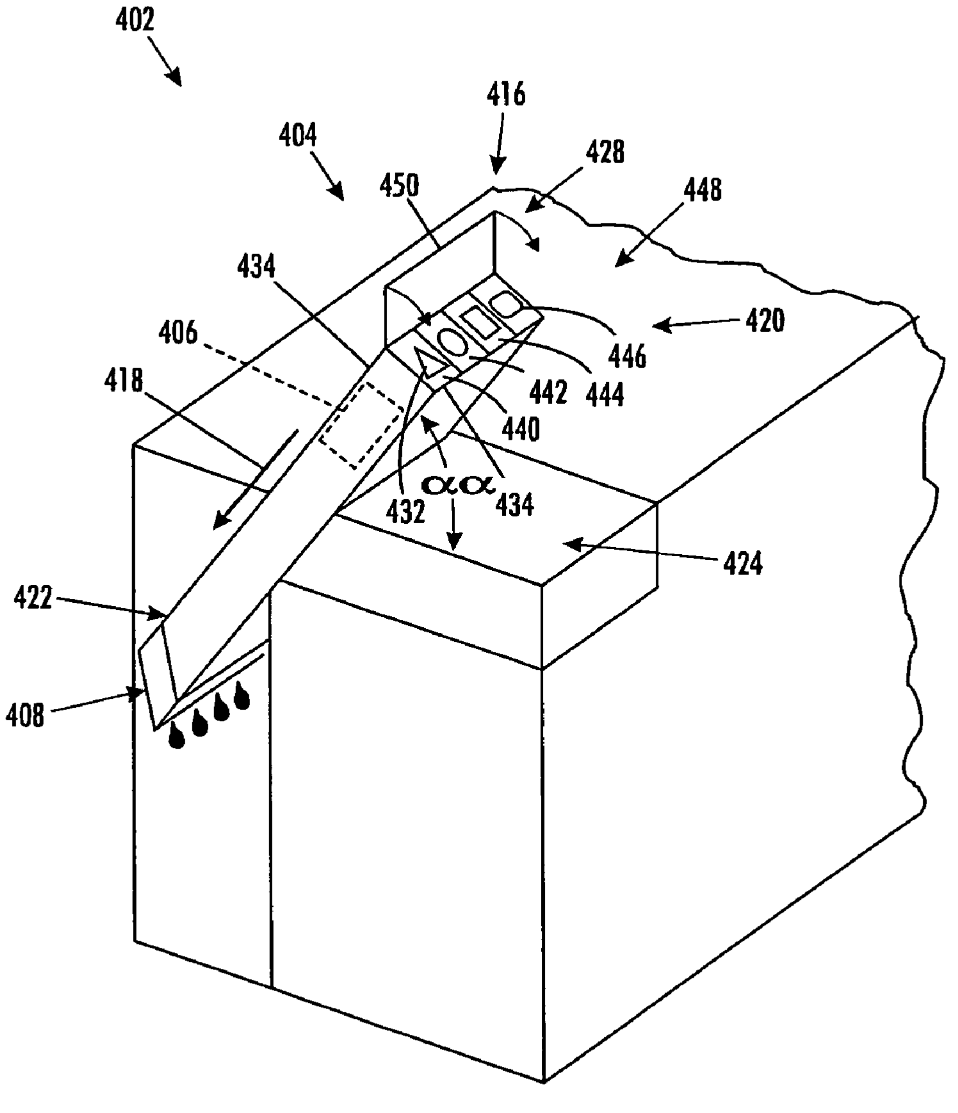
FIG. 6 is a partial perspective view of yet another embodiment of the solid ink delivery system with a chute that has a straight fixed angle with the work surface of the ink printing machine.

Referring now to FIG. 6, yet another embodiment is shown as solid ink delivery system 404 for use in printer 402. The printer 402 of FIG. 6, is similar to printer 202 of FIGS. 2-4, but includes a chute or guide 416 that is linear, rather than arcuate. The chute 416, as shown in FIG. 6, is linear or straight and extends from loading position 420 to delivery position 422 adjacent to a melting station where a melting unit 408 is located and forms an angle $\alpha\alpha$ with respect to work surface 424 of the printer 402. The angle $\alpha\alpha$ is dependent on the coefficient of friction between solid ink sticks 406 and the chute 416 so that sticks 406 advance in the direction of arrow 418 by gravity through stick opening 428 formed in the chute 416. The angle $\alpha\alpha$ is determined based upon the coefficient of friction between bottom chute surface 434 of periphery 432 of the chute 416 and the outer periphery of the stick 406. Friction values are not definite and will vary based on numerous factors of a given system, such as stick size, stick to stick interfaces, angle of travel relative to gravity and so forth.

The chute 416 may include an end opening 448 through which the sticks 406 are inserted into the chute 416. The end opening 448 may have a hinged clear plastic cover 450 to prevent improper objects from inadvertently falling into the chute 416.

The printer 402 may be a color printer and may thus have the guide 416 include a black chute 440, a cyan chute 442, a magenta chute 444, as well as a yellow chute 446.

It should be appreciated that the chute 416 may be fixed at the angle αα as determined by design to get the proper rate of fall of the sticks 406 in the chute 416 or may include a device such that the angle αα may be adjusted or be preset to get the proper angle to get the proper gentle fall of the sticks 406 in the chute 416.

Figure 7:
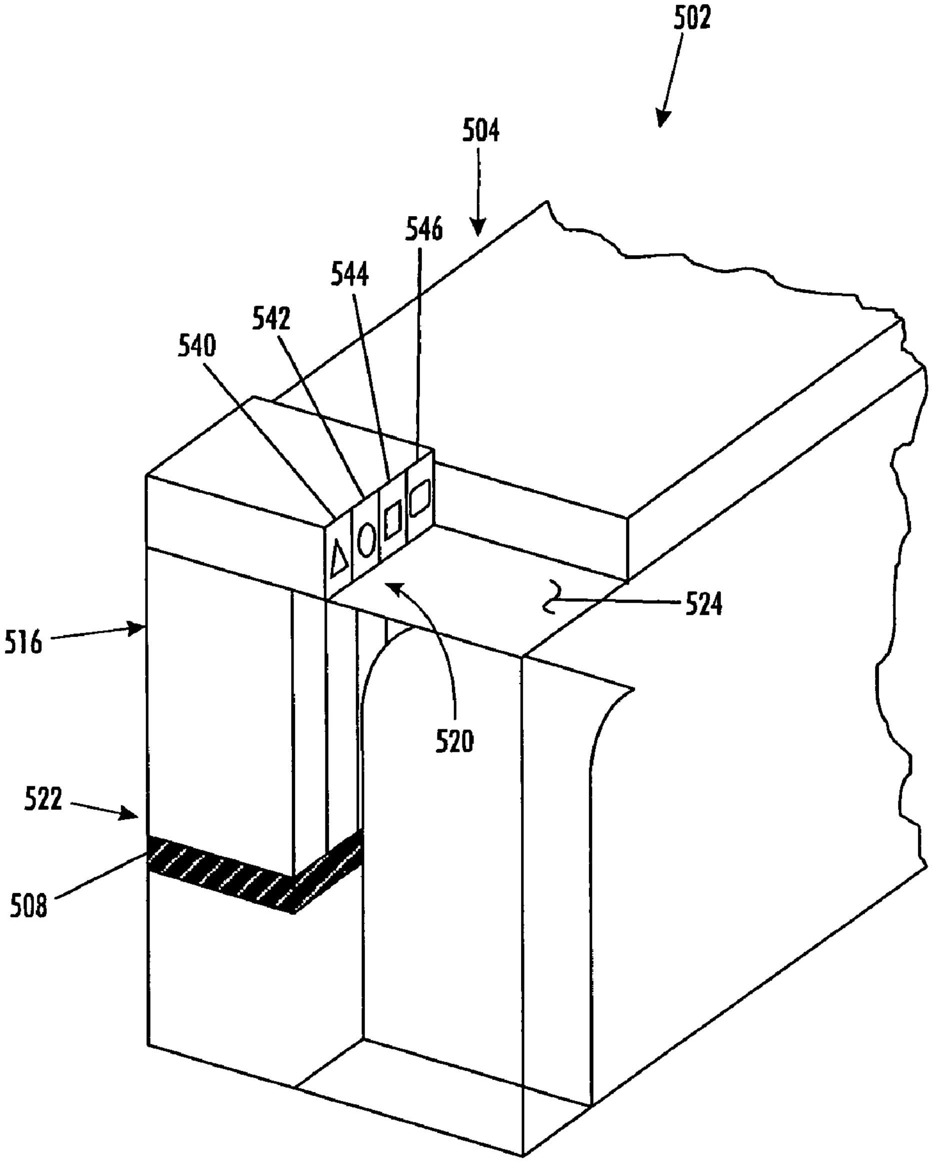
FIG. 7 is a partial perspective view of a further embodiment of the solid ink delivery system with a chute that is straight and perpendicular to the work surface of the ink printing machine.

Referring now to FIG. 7, yet another embodiment is shown as printer 502. The printer 502 is similar to the printer 402 of FIG. 6, except that the printer 502 includes a solid ink delivery system 504 that includes a chute 516 that is straight and vertical. The chute 516 for the printer 502, if a color printer, may include separate chutes for the four respective colors of the printer 502. For example, the chute 516 may include a cyan chute 542, a magenta chute 544, a yellow chute 546, and a black chute 540.

The chute 516 defines a loading position 520 positioned adjacent work surface 524. The chute 516 also defines a delivery position 522 adjacent melting units 508. It should be appreciated that the sticks 506 that are fitted into the chute 516 may be positioned or placed along the work surface 524 in front of the openings 548 and advanced into the openings 548 until they drop into the chute 516.

Several designs may be utilized to avoid having the sticks 506 fall uncontrollably down the chute 516, become miss-positioned within the chute 516, break, or damage the melting units 508. It should be appreciated that a spring loaded device may be positioned in the chute 516 that operates like a cafeteria food tray holder to cause the sticks to descend gently against the melting units 508 at the delivery position 522.

Alternatively, the sticks 506 may be very closely fitted to the respective chute 516 such that the sticks are carefully guided downwardly in the proper vertical direction. It should be appreciated that guides may be positioned in the chute 516, with features in the chute 516 to prevent the stick 506 from beginning its descent down the chute 516 toward the delivery position 522 until the stick 506 is fully positioned in the chute 516.

Figure 8:
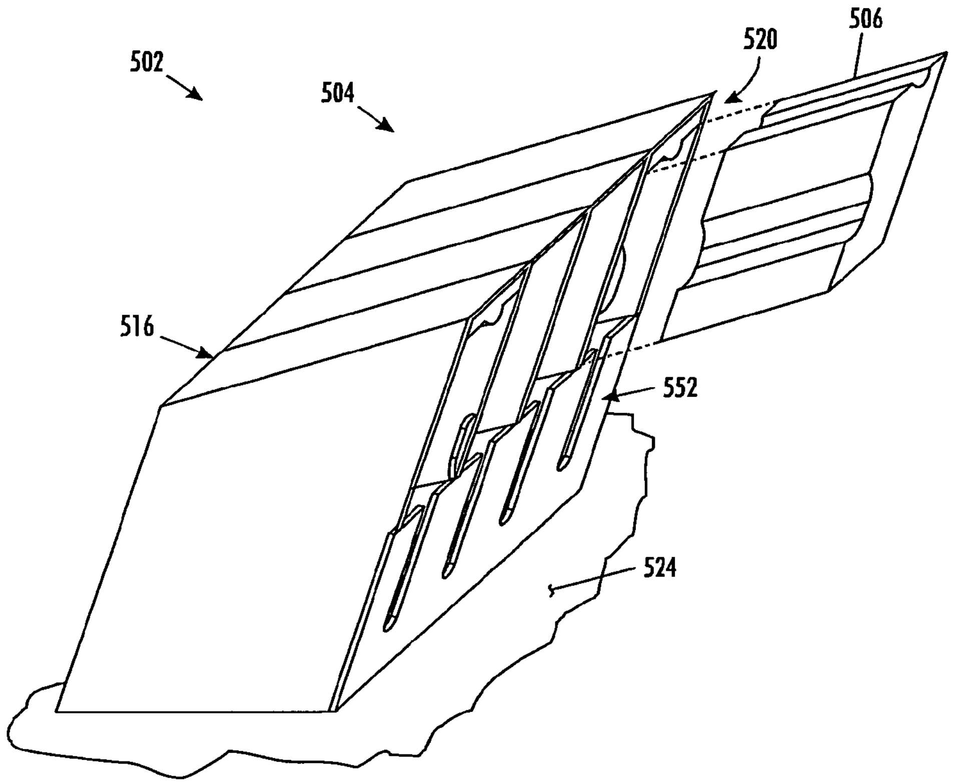
FIG. 8 is a perspective view of the loading position of the chute of the solid ink delivery system of FIG. 7.

Referring now to FIG. 8, the printer 502 is shown with the ink delivery system 504 including the loading position 520 shown in greater detail. The sticks 506 may be loaded adjacent the work surface 524 and positioned into the chute 516 and a finger access slot 552 may be utilized to assure the proper decent of the stick 506 down the chute 516.

Figure 9:
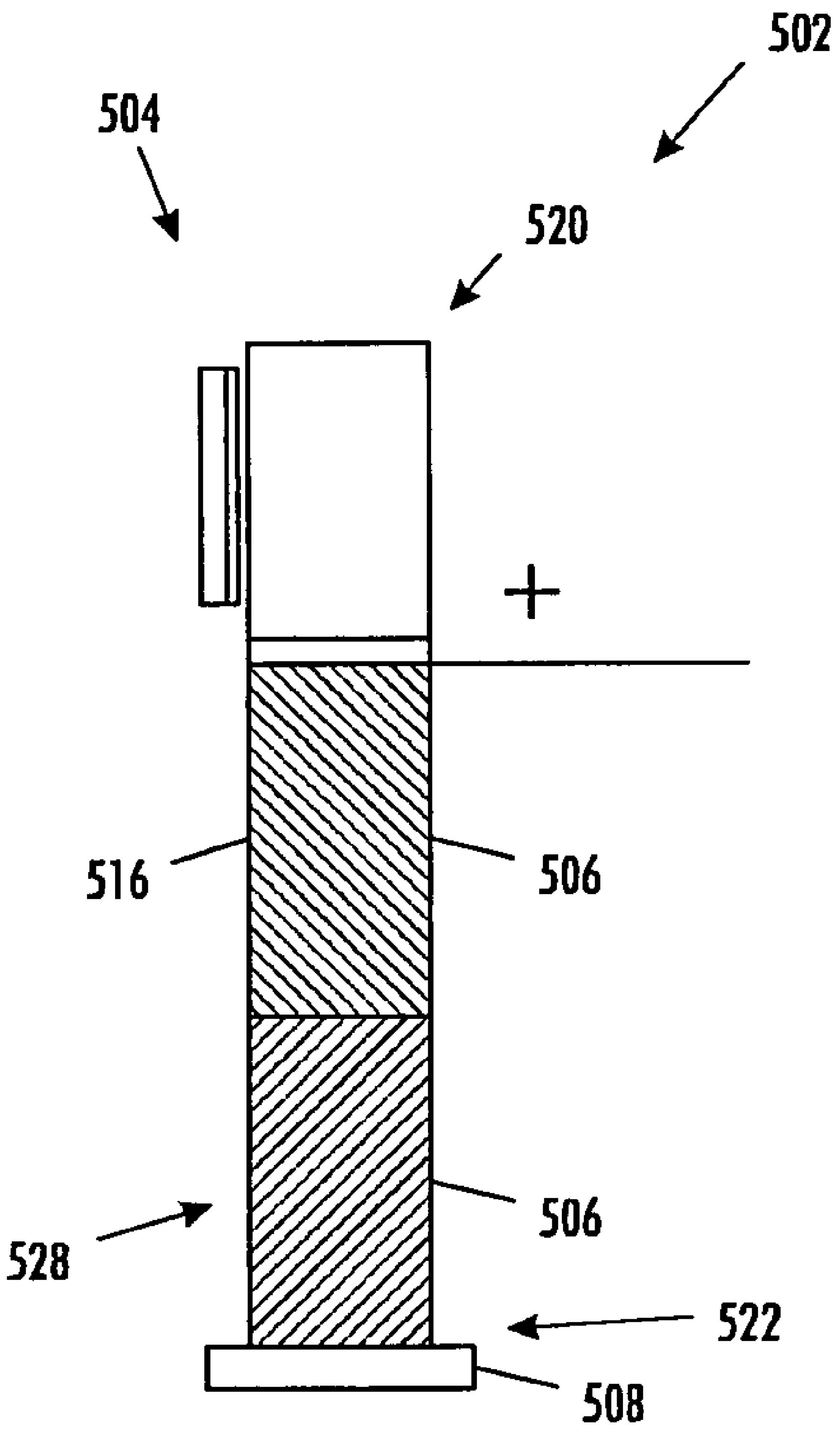
FIG. 9 is a partial plan view, partially in cross-section, of the solid ink delivery system of FIG. 7.

Referring now to FIG. 9, the chute 516 of the ink delivery system 504 of the printer 502 is shown in greater detail showing the sticks 506 in position from the loading position 520 to the delivery position 522 adjacent the melting units 508. It should be appreciated that the sticks 506 closely conform to the stick opening 528 formed in the chute 516 to prevent cross loading or mal-positioning of the sticks 506.

Referring now to FIG. 4, the stick 506 and the chute 516 of the ink delivery system 504 of the printer 502 is shown in greater detail near the loading position 520 of the ink delivery system 504. To assure the proper solid ink stick 506 is placed in the chute 516, the stick 506 and the chute 516 may have matched keying systems in the form of, for example, bosses 536 located on the stick 506 that mate with recesses 538 formed in the chute 516. The bosses 536 and recesses 538 serve to assure that only the proper solid ink stick is feed into the chute 516. This is particularly important in color machines where the improper color of ink stick should not be loaded into the wrong chute. The bosses 536 and recesses 238 may be formed in a secondary component affixed to the chute and may employ size, shape and keying features exclusively or in concert with features of the chute to admit or exclude ink shapes appropriately. For convenience, the insertion and keying function in general will be described as integral to the chute 516.

Figure 10:
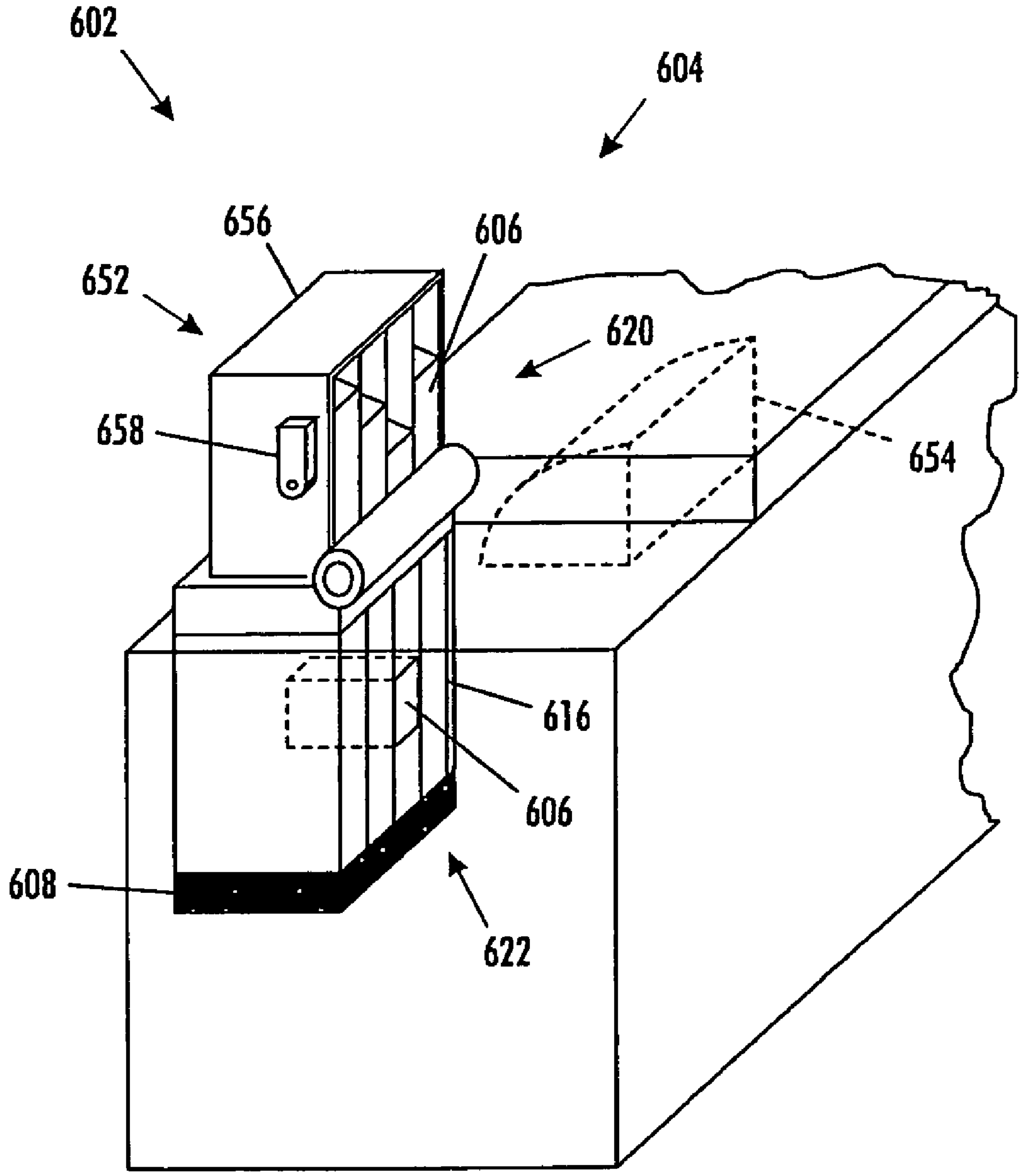
FIG. 10 is a partial perspective view of a further embodiment of the solid ink delivery system with a chute that has a lower portion that is straight and perpendicular to the work surface of the ink printing machine and an upper portion pivotably connected to the lower portion.

Referring now to FIG. 10, yet another embodiment is shown as printer 602. The printer 602 is similar to the printer 502 of FIGS. 7-9 except that the printer 602 has a solid ink delivery system 604 which utilizes a different method of loading the ink sticks into the ink delivery system.

The ink delivery system 604 includes a chute 616 which delivers the sticks 606 to the delivery position 622 adjacent the melting units 608. The chute 616 is a vertical chute but provides for a method different than the chute 516 of the printer 502 of FIGS. 7-9 for delivering the stick 606 to the chute 616.

For example, and as shown in FIG. 10, the load position 620 of the chute 616 provides for a loader 652 which has a first loading position 654 where the sticks 606 are loaded vertically downward into the loader 652. The loader 652 is then moved from the first loading position 654 as shown in phantom to the second delivery position 656 as shown in solid. When in the second delivery position 656 the sticks 606 are released by release lever 658 to drop into the chute 616.

Figure 11:
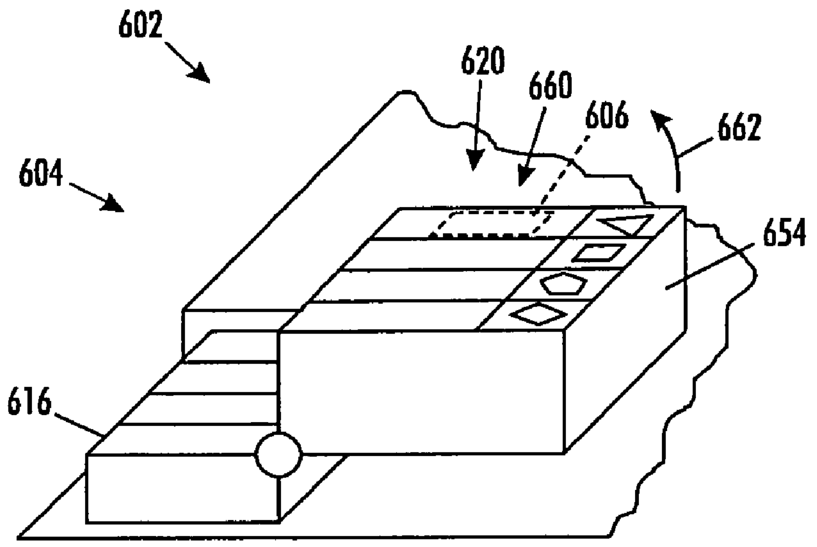
FIG. 11 is a partial perspective view of the solid ink delivery system of FIG. 10 showing the upper portion in a loading position.

Referring now to FIG. 11, the first loading position 654 of the loader 652 is shown in greater detail. The first loading position 654 includes vertical openings 660 into which the sticks 606 are fitably positioned. The loader 652 is then rotated in the direction of arrow 662 to the second delivery position 656, as shown in FIG. 10, and the stick 606 advances to the delivery position 622 adjacent the melting units 608.

Figure 12:
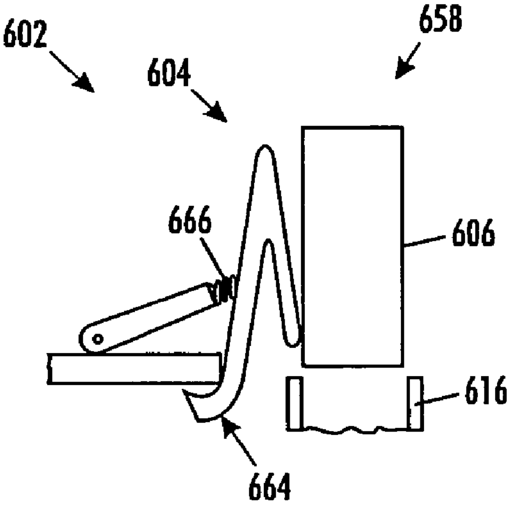
FIG. 12 is a plan view of a catch to use with the solid ink delivery system of FIG. 10.

Referring now to FIG. 12, the release lever 658 is shown in greater detail. The release lever 658 includes a pivoting link 664 which is constrained by a spring 666 and, upon the positioning of the ink stick 606, is released to drop in position in the chute 616.

Figure 13:
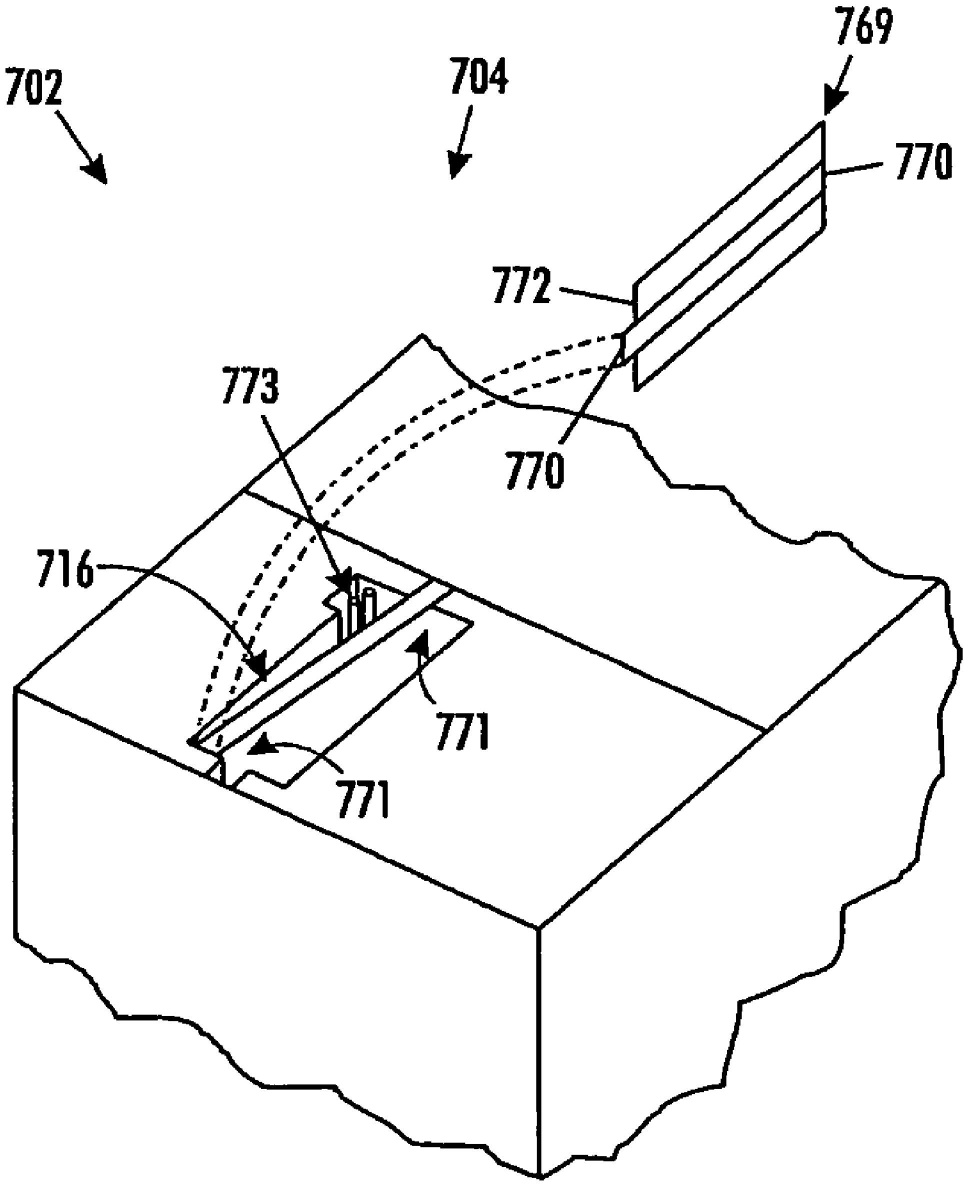
FIG. 13 is a partial perspective view of a further embodiment of the solid ink delivery system with a chute that is detachable from the printer.

Referring now to FIG. 13, yet another embodiment is shown as printer 702. The printer 702 is similar to the printer 402 of FIG. 6 except that the printer 702 includes a solid ink delivery system 704 that includes a chute 716 that is modular. The chute 716 includes a removable upper portion 769 that includes alignment rails 770 that slide into grooves 771 formed in lower portion of the chute 716 of the printer 702. The upper portion includes an upper electrical connection 772 that mates with a lower electrical connection 773 of the lower portion of the chute 716.

Figure 14:
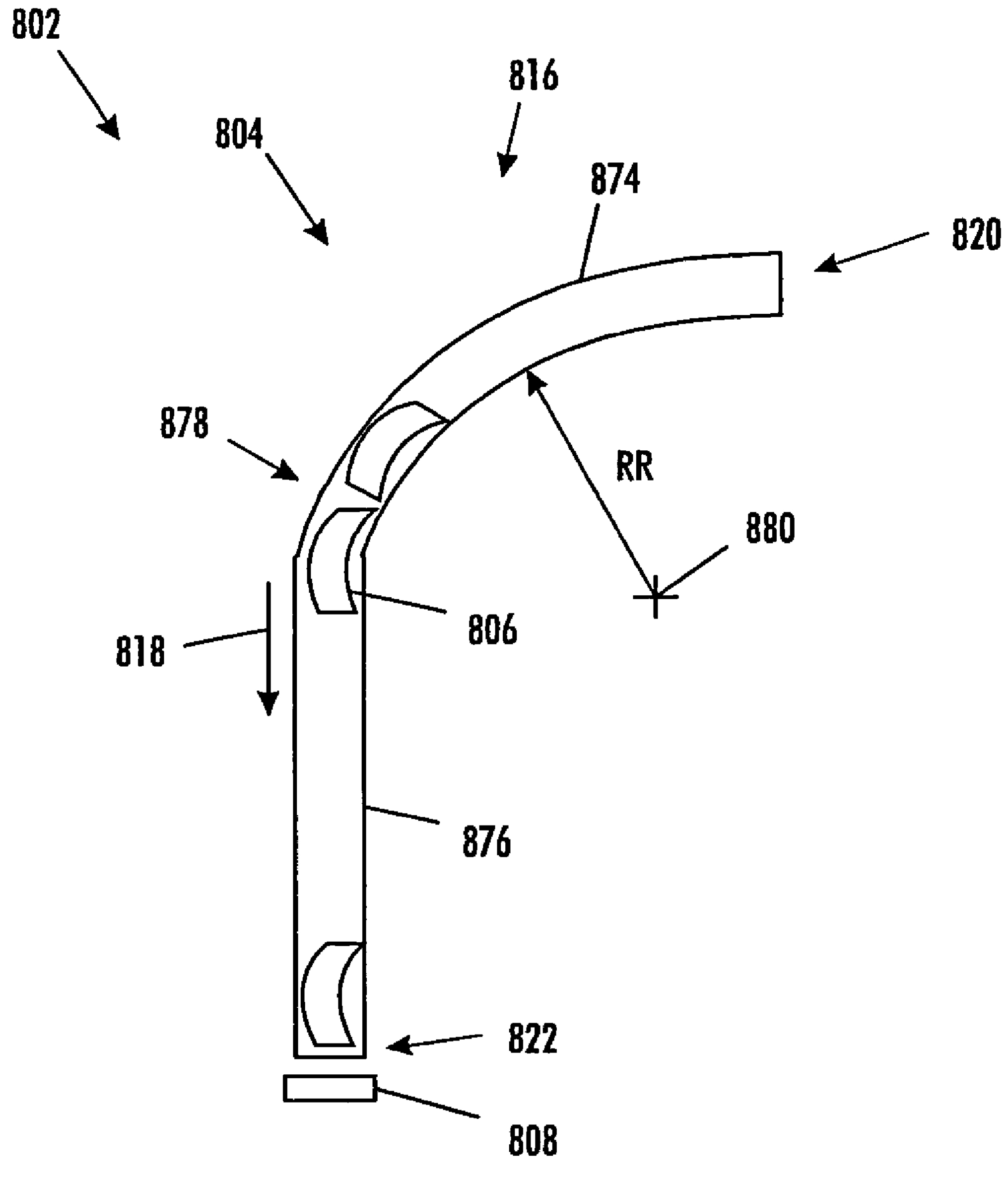
FIG. 14 is a plan view, partially in cross section, of a further embodiment of the solid ink delivery system in the form of a solid ink delivery system with a chute having a linear portion and a curved portion.

Referring now to FIG. 14, yet another embodiment is shown as printer 802. The printer 802 includes a solid ink delivery system 804 that has a chute 816 that includes an arcuate upper portion 874 and a linear lower portion 876. The arcuate upper portion 874 may extend from the loading position 820 to the transition position 878 located between the arcuate upper portion 874 and the linear lower portion 876 of the chute 816. The arcuate upper portion 874 may be defined by radius RR extending from origin 880. The linear lower portion 876 extends from the transition position 878 to delivery position 822 adjacent melting unit 808. The linear lower portion 876, as shown in FIG. 14, may be vertical. It should be appreciated that the linear portion 876 may, alternatively, be angled.

The stick 806 for use in the printer 802 may be rectangular or may, as is shown in FIG. 14, be arcuate. The arcuate shape of the stick 806 permits the motion of the stick 806 through the arcuate upper portion 874 and the transition position 878 of the chute 816.

Figure 15:
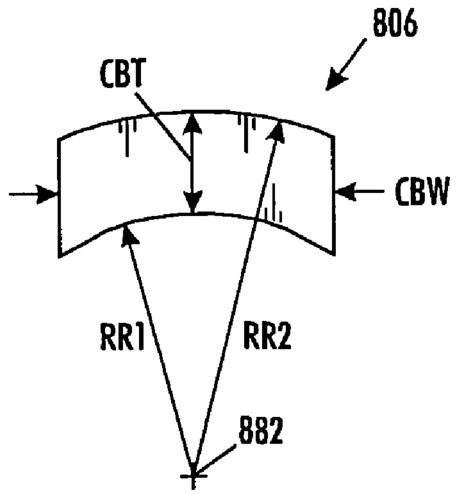
FIG. 15 is a plan view of the ink stick for use in the chute of the solid ink delivery system of FIG. 14.

Referring now to FIG. 15, the stick 806 of the printer 802 is shown in greater detail. The stick 806 has a width CBW and a thickness CBT. The thickness CBT is defined by radius RR1 and RR2 extending from origin 882. Radii RR1 and RR2 may be optimized depending on the shape of the arcuate upper portion 874 and the linear lower portion 876 of the chute 816 of the delivery system 804 of the printer 802.

Figure 16:
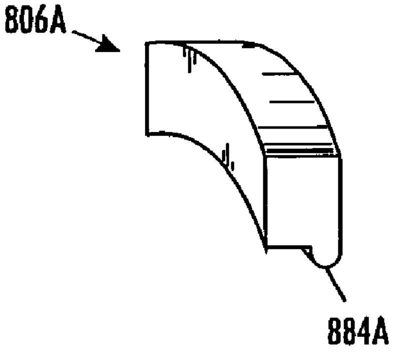
FIG. 16 is a perspective view of another ink stick with a guidance feature for use with a further embodiment of the solid ink delivery system.

Referring now to FIG. 16, an alternate solid ink stick 806A is shown for use in the printer 802. It should be appreciated that the solid stick 806A includes a guidance feature 884A that conforms to a mating groove in the chute (not shown).

Figure 17:
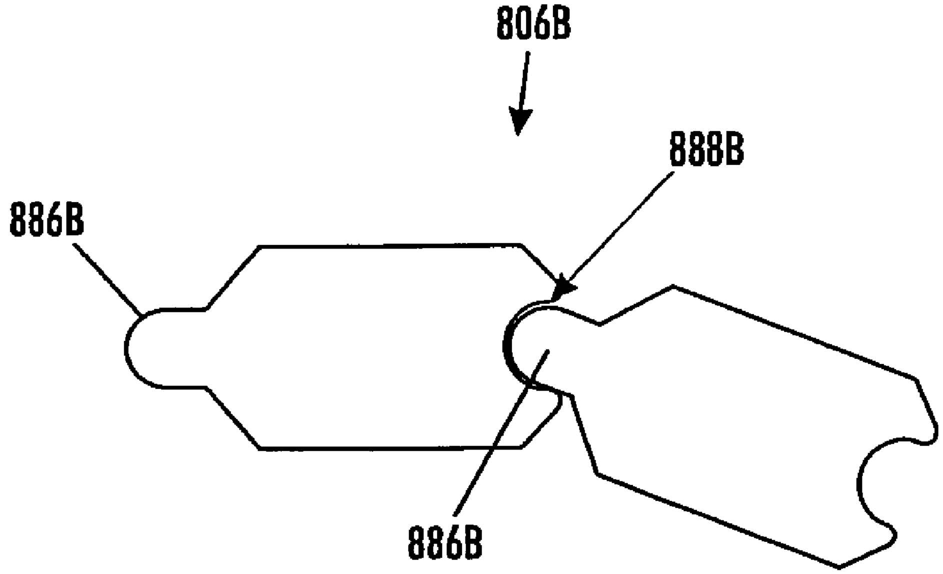
FIG. 17 is a plan view of an ink stick with an adjacent ink stick guidance feature for use with the solid ink delivery system.

Referring now to FIG. 17, a solid ink stick 806B is shown for use in prescribed path 818 of the chute 816 of FIG. 14. The stick 806B includes a protrusion 886B at one end which mates with a groove 888B in the opposed end of the sticks 806B. The protrusion 886B and the groove 888B serve to guide the sticks 806B through the chute 816 of the delivery system 804 of FIG. 14.

Figure 18:
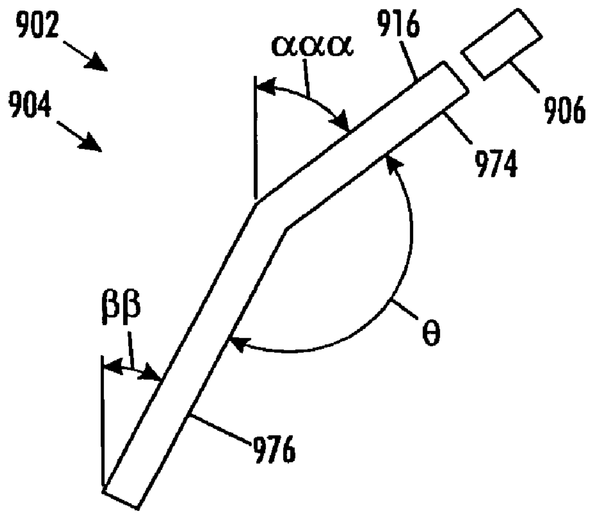
FIG. 18 is a plan view of a further embodiment of the solid ink delivery system in the form of a solid ink delivery system with a chute having a first linear portion and a second linear portion.

Referring now to FIG. 18, yet another embodiment is shown for a printer 902. The printer 902 includes a solid ink delivery system 904 which has a chute 916 which is different than the chute 816 of the printer 804 of FIG. 14. The chute 916 receives the sticks 906. The chute 916 includes a first linear portion 974 that forms an angle $\alpha\alpha\alpha$ with respect to the vertical and a second linear portion 976 that forms an angle $\beta\beta$ with the vertical. The first portion 974 and the second portion 976 form an angle $\theta$ there between.

Figure 19:
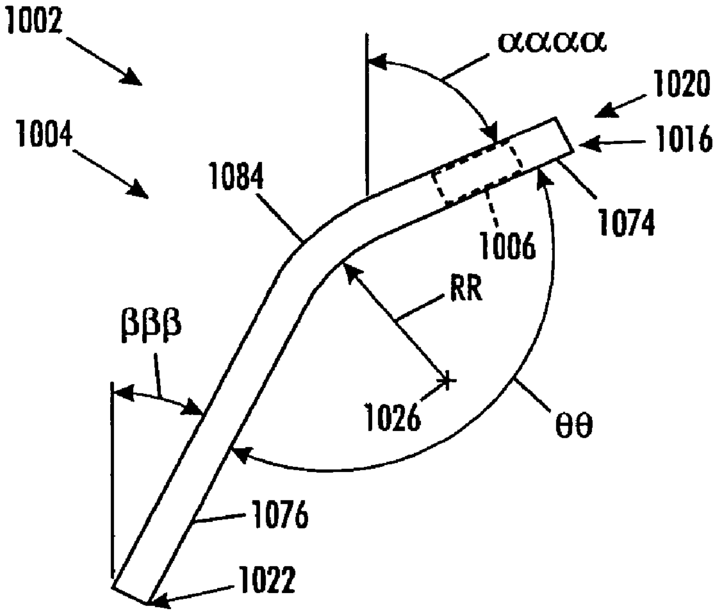
FIG. 19 is a plan view, partially in cross section, of a further embodiment of the solid ink delivery system in the form of a solid ink delivery system with a chute having a first linear portion, a curved portion and a second linear portion.
Figure 20:
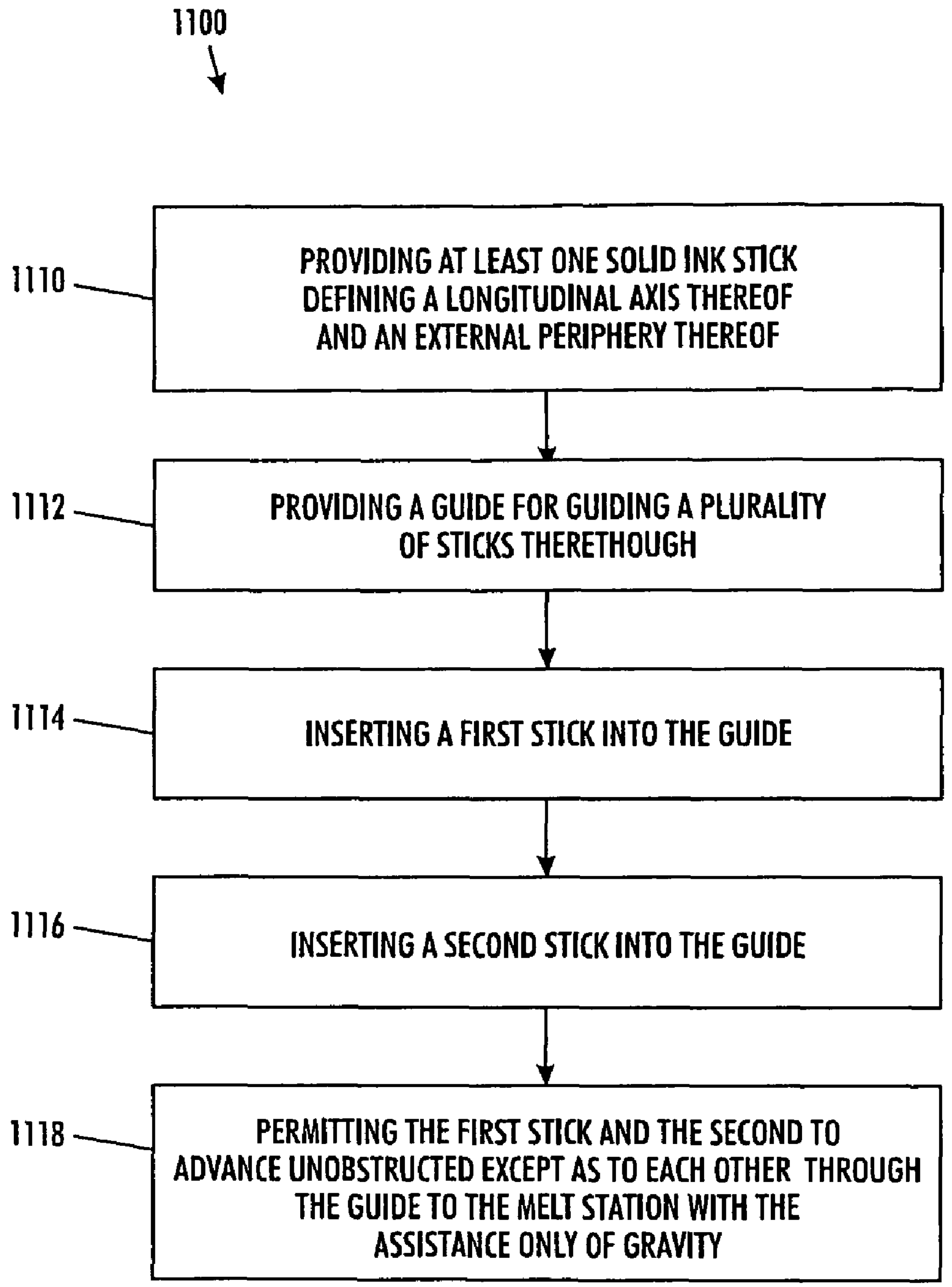
FIG. 20 is a flowchart detailing the basic steps of advancing ink in a solid ink printer.

Referring now to FIG. 19, another embodiment is shown for a printer 1002. The printer 1002 includes a solid ink delivery system 1004 which has a chute 1016 which has three separate portions for advancing sticks 1006. The chute 1016 includes a first linear portion 1074 that extends downwardly from loading position 1020. An arcuate portion 1084 connects the first linear portion 1074 to a second linear portion 1076 that extends downwardly to delivery position 1022. The first linear portion 1074 forms an angle $\alpha\alpha\alpha\alpha$ with respect to the vertical, while the second linear portion 1076 forms an angle $\beta\beta\beta$ with respect to the vertical. The first linear portion 1074 and the second linear portion 1076 are connected by the arcuate portion 1084 which defines an angle $\theta\theta$ there between as well as a radius RR extending from origin 1026.

The method 1100 further includes a second step 1112 of providing a guide for guiding a plurality of sticks therethough.

The method 1100 further includes a third step 1114 of inserting a first stick into the guide and a fourth step 1116 of inserting a second stick into the guide.

The method 1100 further includes a fifth step 1118 of permitting the first stick and the second to advance unobstructed except as to each other through the guide to the melt station with the assistance only of gravity.

The method 1100 may further include a guide which defines a longitudinal axis of the path of the stick as it advances and the step of inserting the stick into the guide may include inserting the stick into the guide in the direction of the longitudinal axis of the guide.

The method 1100 may further include a guide which defines a longitudinal axis defining the path of the stick as it advances with the path being linear.

The method 1100 may further include a guide which defines a longitudinal axis defining the path of the stick as it advances with the path being arcuate.

Variations and modifications of the printer and method disclosed herein are possible, given the above description. However, all variations and modifications which are obvious to those skilled in the art to which the printer described herein pertains are considered to be within the scope of the protection granted by this Letters Patent.

What is claimed is:

1. A solid ink delivery system comprising:

a chute having a first end and a second end, the first end of the chute being positioned proximate a surface of a printer and the second end of the chute being positioned proximate a melting device located within the printer, the first end of the chute having an opening formed in the first end, the opening being configured with a width and a height that are larger than a width and a height, respectively, of a solid ink stick by an amount that enables only one solid ink stick having the solid ink stick width and the solid ink stick height to be inserted into the opening at a single time, the chute having a length that is longer than a length of the solid ink stick having the solid ink stick width and the solid ink stick height;

an outlet formed in the second end of the chute to enable the solid ink stick having the solid ink stick width and the solid ink stick height to be delivered from the second end of the chute to a melting device positioned below the outlet; and a channel within the chute that forms a continuous path from the opening in the first end of the chute to the outlet in the second end of the chute, the channel having a first arcuate portion that is longer than the solid ink stick length and a second linear portion that is longer than the solid ink stick length, the opening and the first arcuate portion of the channel being higher than the second linear portion of the channel, and the first arcuate portion and the second linear portion of the channel being configured to enable the solid ink stick having the solid ink stick width and the solid ink stick height to travel by gravity alone from the opening through the first arcuate portion of the channel, the second linear portion of the channel, and the outlet to the melting device positioned below the outlet.

2. The solid ink delivery system of claim 1, wherein at least a portion of of the channel is coated with polytetrafluoroethylene.

3. The solid ink delivery system of claim 2 wherein a bottom surface of the channel is coated with the polytetrafluoroethylene.

4. The solid ink delivery system of claim 1 wherein the opening in the first end of the chute is rectangular.

5. The solid ink delivery system of claim 1 wherein the opening in the first end of the chute is triangular.

6. The solid ink delivery system of claim 1 wherein the opening in the first end of the chute is pentagonal.

7. The solid ink delivery system of claim 1 further comprising:

a lubricious tape on a bottom surface of the channel.

8. The solid ink delivery system of claim 1 further comprising:

a hinged cover mounted proximate to the opening in the first end of the chute to selectively enable access to the opening.

* * * * *